(12) United States Patent
Oguma

(10) Patent No.: US 6,516,205 B1
(45) Date of Patent: Feb. 4, 2003

(54) PORTABLE TERMINAL WITH BUS MANAGER SWITCHING FUNCTION

(75) Inventor: Kenji Oguma, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/557,372

(22) Filed: Apr. 25, 2000

(30) Foreign Application Priority Data

Apr. 28, 1999 (JP) .......................................... 11-122626

(51) Int. Cl.[7] .................................................. H04B 1/38
(52) U.S. Cl. ...................... 455/557; 455/556; 455/572; 455/575
(58) Field of Search ........................ 455/90, 556, 557, 455/572, 575, 569, 550, 563, 127

(56) References Cited

U.S. PATENT DOCUMENTS

| | | | |
|---|---|---|---|
| 6,255,800 B1 * | 7/2001 | Bork ........................... | 320/115 |
| 6,377,825 B1 * | 4/2002 | Kennedy et al. ............ | 455/556 |
| 2001/0021659 A1 * | 9/2001 | Okamura .................... | 455/557 |

FOREIGN PATENT DOCUMENTS

| | | |
|---|---|---|
| JP | 10-301898 | 11/1998 |
| JP | 10-301899 | 11/1998 |
| JP | 200-222340 | 8/2000 |

OTHER PUBLICATIONS

Japanese Office Action dated Mar. 12, 2002 (w/ English translation of relevant portion).

* cited by examiner

*Primary Examiner*—Thanh Cong Le
*Assistant Examiner*—Tan Trinh
(74) *Attorney, Agent, or Firm*—Dickstein, Shapiro, Morin & Oshinsky LLP

(57) ABSTRACT

A portable terminal, includes a host detector, a hub circuit and a bus manager circuit. The host detector detects whether a host operates as a bus manager. The hub circuit has a hub function and is connectable to an external device. The bus manager circuit has a bus manager function. The bus manager circuit stops the bus manager function such that the host can operate as the bus manager for the portable terminal and the external device connected to the portable terminal, when the host operates as the bus manager. Also, the bus manger circuit carries out the bus manager function such that the bus manager circuit can operate as the bus manager for the portable terminal and the external device connected to the portable terminal, when the host does not operate as the bus manager.

9 Claims, 2 Drawing Sheets

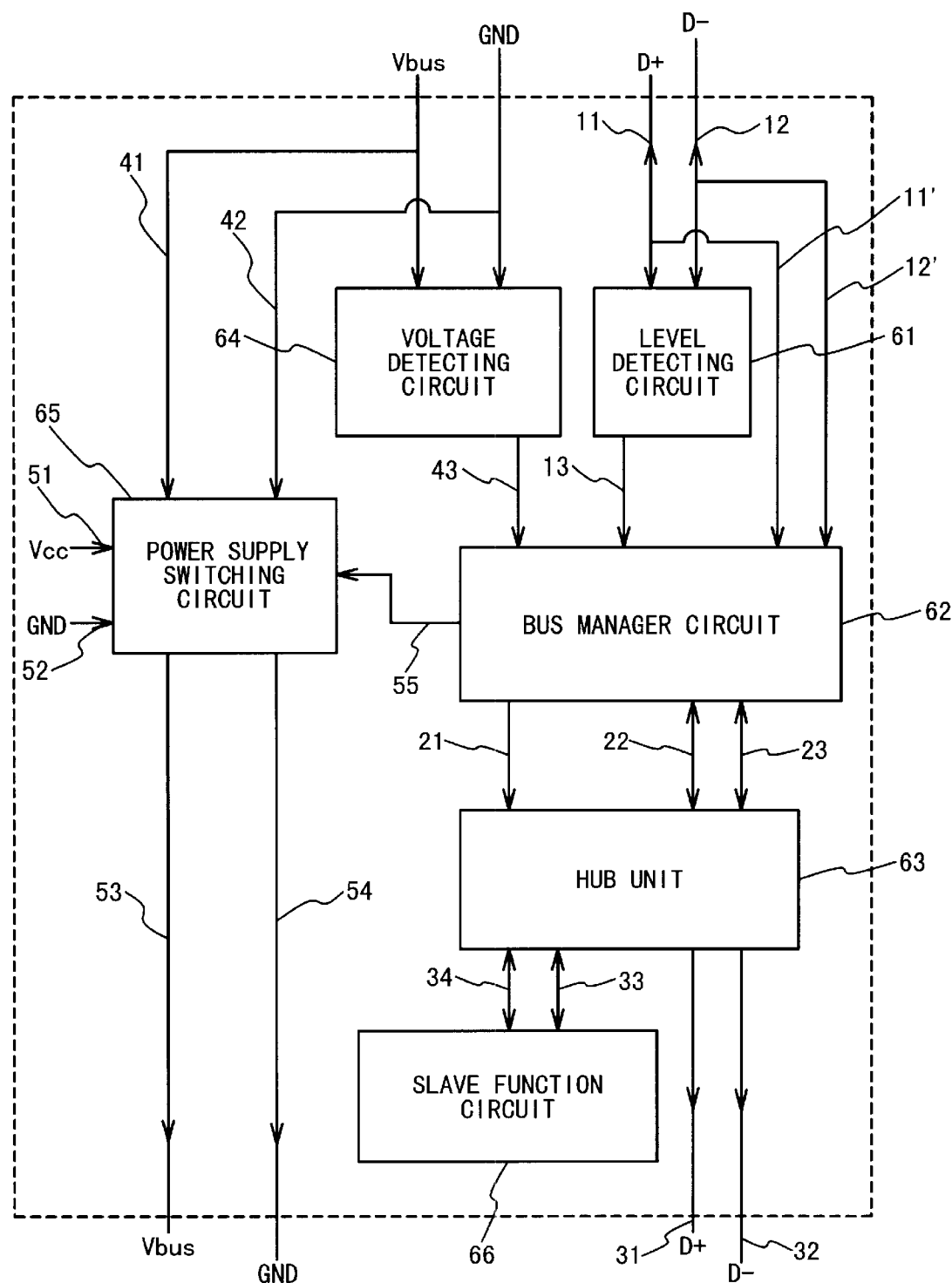

PORTABLE TERMINAL WITH BUS MANAGER SWITCHING FUNCTION

BACKGROUND OF THE INVENTION

1. Field of the Invention

The present invention relates to a mobile terminal, and more particularly to a mobile terminal such as a portable terminal with a bus manager switching function.

2. Description of the Related Art

A camera having USB (universal serial bus) is known. An image is picked up by such a camera and is transmitted to a destination node using a portable phone. In this case, USB is added to the portable phone, and a USB bus manager is built in USB to accomplish a bus control function.

In such a conventional example, a portable phone is connected with a personal computer. The image data is received through a radio channel and is printed using a high resolution printer which is already connected with the personal computer by use of USB. Alternatively, an application is assumed to update the firmware of the portable phone through data communication with the PC. In this case, the portable phone desirably has a function as a USB bus slave to operate in response to an instruction from the personal computer.

There is a case that the host personal computer is in its operating state and a plurality of devices containing the portable phone operate as bus peripheral devices of the host personal computer on a USB bus tree. On the other hand, there is a case that there is not the host personal computer, so that the portable phone needs to operate as a bus manager. However, there is no means adaptable for various operation conditions. Therefore, it is desirable for the portable phone to have both of a function as the USB bus manager and a function as the USB bus slave.

In conjunction with the above description, an electronic equipment and an interface circuit are disclosed in Japanese Laid Open Patent Application (JP-A-Heisei 10-301898). In this reference, the electronic equipment has an interface circuit to connect another equipment. The interface circuit is composed of a plurality of connectors (30 and 32) for which the terminals to connect data lines are provided, bidirectional line drivers (36 and 38) which send and receive signals through the data lines corresponding to the plurality of connectors (30 and 32), a rout section 34, transistors (44, 46, 48, 50, 52 and 54) to switch a plurality of routes provided in the route section 34, and a USB control unit 42 which controls the route switching operation. The route section 34 is composed of routes between the plurality of connectors (30 and 32) and the line drivers (36 and 38), respectively, and routes between the terminals of the plurality of connectors (30 and 32).

Also, an electronic equipment and an interface circuit are disclosed in Japanese Laid Open Patent Application (JP-A-Heisei 10-301899). The electronic equipment has an interface circuit to connect another equipment. The interface circuit is composed of a USB connector (30) having the terminals to connect data lines (D+ and D−) and power supply lines (Vcc and GND), a power supply section (32) to supply power through power supply lines, a switching section 34 to selectively connect pull-up resistor (R2:44 and 48), and pull-down register (R1:46 and 49) to the data lines (D+ and D−) and to switch connection between the power supply section (32) and the power supply line (Vcc), and a USB control unit (38) for the above connection and switching.

SUMMARY OF THE INVENTION

Therefore, an object of the present invention is to provide a portable phone with a function as a USB bus manager and a function as a USB bus slave.

In order to achieve an aspect of the present invention, a portable terminal, includes a host detector, a hub circuit and a bus manager circuit. The host detector detects whether a host operates as a bus manager. The hub circuit has a hub function and is connectable to an external device. The bus manager circuit has a bus manager function. The bus manager circuit stops the bus manager function such that the host can operate as the bus manager for the portable terminal and the external device connected to the portable terminal, when the host operates as the bus manager. Also, the bus manger circuit carries out the bus manager function such that the bus manager circuit can operate as the bus manager for the portable terminal and the external device connected to the portable terminal, when the host does not operate as the bus manager.

The host detector outputs a bus manager indication signal in response to reception of a signal from the host. At this time, the bus manager circuit determines that the host operates as the bus manager, in response to the bus manager indication signal.

Also, the portable terminal may further includes a host connection detector detecting whether the host is connected. At this time, the bus manager circuit carries out the bus manager function, when the host is not connected. More specifically, the host connection detector detects whether a power source voltage is supplied, and determines that the host is connected when the power supply voltage is supplied. Also, in this case, the portable terminal may further includes an internal power source supplying a power source voltage, and a switching circuit. The switching circuit outputs one of the power source voltage from the host and the power source voltage from the internal power source to the external device in response to a power control signal, when the external device. The bus manager circuit generates the power control signal when the host is connected.

In order to achieve another aspect of the present invention, a bus manager control method, is accomplished by (a) determining whether a host is connected to a portable terminal, the host having a bus manager function, and the portable terminal having a bus manager function and a hub function and being connectable with an external device; by (b) determining whether the host is in a suspended state, when it is determined that the host is connected to the portable terminal; by (c) stopping the bus manager function of the portable terminal such that the host can operate a bus manager for the portable terminal and the external device connected to the portable terminal, when the host is connected to the portable terminal and is not in the suspended state; and by (d) carrying out the bus manager function of the portable terminal such that the portable terminal can operate as the bus manager for the portable terminal and the external device connected to the portable terminal, when the host is not connected to the portable terminal or when the host is in the suspended state.

For the purpose of the (a) determining, a power source voltage from the host is detected, and then it is determined that the host is connected to the portable terminal, when the power source voltage is detected. Also, the power source voltage is connected to the external device, when the power source voltage is detected.

Also, for the (b) determining, a signal transferred from the host is detected, and then it is determined that the host operates as the bus manager, when the signal is transferred from the host.

BRIEF DESCRIPTION OF THE DRAWINGS

FIG. 3 is a block diagram showing the structure of the portable phone as a mobile terminal for an automatic manager switching function.

DESCRIPTION OF THE PREFERRED EMBODIMENTS

Next, a mobile terminal system using a portable phone as a mobile terminal of the present invention will be described below in detail with reference to the attached drawings.

Figure 1:
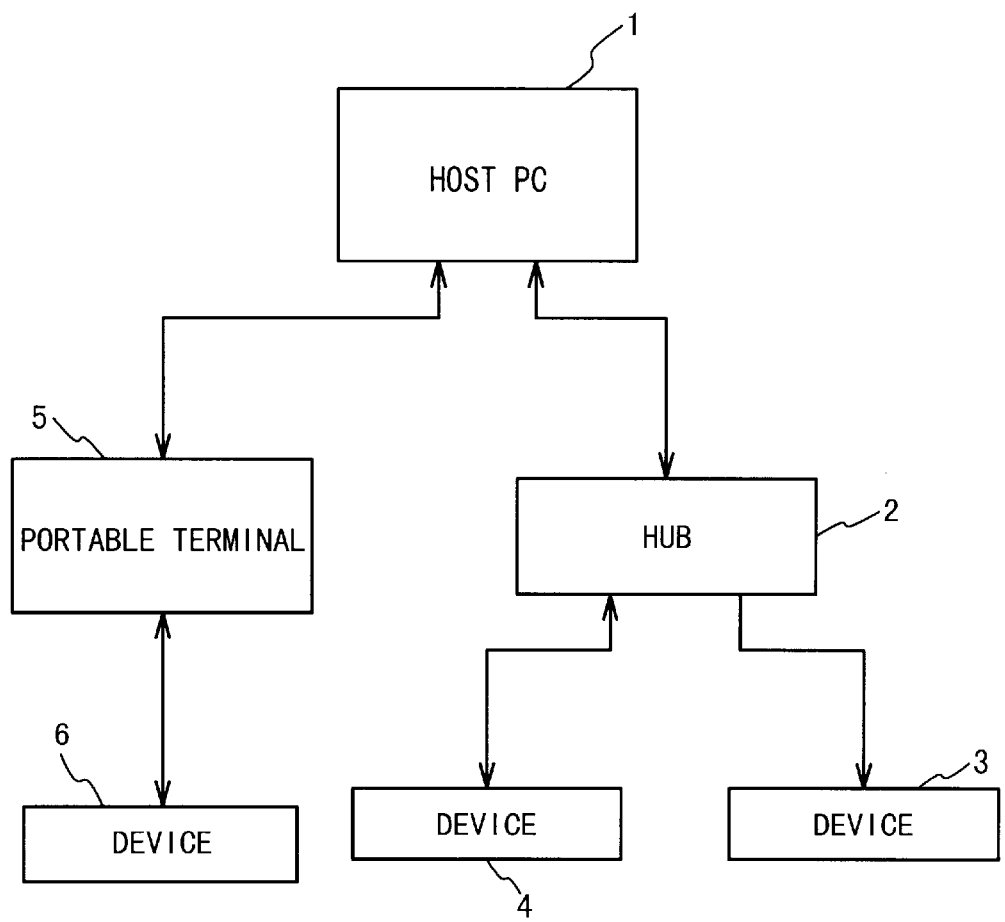
FIG. 1 is a block diagram showing an example of a mobile terminal system to which a portable phone according to an embodiment of by the present invention is applied.

FIG. 1 shows the mobile terminal system according to an embodiment of the present invention. Referring to FIG. 1, the mobile terminal system is composed of a host personal computer, a hub 2 connected to the host personal computer 1, a portable phone 5 as the mobile terminal 5 connected to the host personal computer 1, and first and second devices 3 and 4 connected to the hub 2 and a third device 6 connected to the portable phone 5.

Referring to FIG. 1, the host personal computer 1 on a USB bus tree functions as a usual bus manager, and the hub 2 and the portable phone 5 function as bus peripheral units of the host personal computer 1. When the host personal computer 1 does not function as the bus manager, the hub 2 and the portable phone 5 function as a bus submanager. When the host personal computer 1 is in a suspended state or a non-operation state, the host personal computer 1 does not supports a data transferring operation on the USB bus. When the host personal computer 1 is in the suspended state, the portable phone 5 sends a resume request to the host personal computer 1. Then, when the host personal computer 1 restarts the operation, the portable phone 5 functions as the bus peripheral unit.

Figure 2:
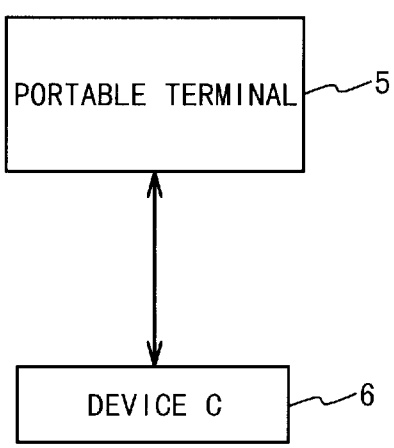
FIG. 2 is a block diagram showing another example of the mobile terminal system to which the portable phone according to the embodiment of the present invention is applied, when a host bus manager does not exist.

Also, when the portable phone 5 is not connected with the main bus manager, the portable phone 5 functions as the bus manager, as shown in FIG. 2. In this case, the third device 6 functions as one of the bus peripheral units of the portable phone 5. Also, the third device 6 operates as not a peripheral unit of the host personal computer 1 but the peripheral unit of the portable phone 6.

FIG. 3 shows the detail of the automatic function switching mechanism incorporated in the portable phone as the mobile terminal. In the automatic function switching mechanism, a set of a USB signal line D+ 11 and a USB signal line D− 12 as a set of signal lines, and a set of power supply line Vbus 41 and a power supply line GND 42 are provided. These lines are connected with a host personal computer on the upstream side via USB terminals (not shown). The USB signal line D+ 11 and the USB signal line D− 12 are connected with a level detecting circuit 61. The level detecting circuit 61 monitors and detects a USB signal on the lines D+ 11 and D− 12. A bus manager circuit 62 is connected to the signal lines D+ 11 and D− 12 through signal lines 11' and 12'. The monitoring or detecting result of the level detecting circuit 61 is transferred to the bus manager circuit 62 as a level detection signal or a host state signal 13. The host state signal indicates whether the host personal computer 1 is in the suspended state or in the operation state.

The power supply lines Vbus 41 and GND 42 are connected with a voltage detecting circuit 64. The voltage detecting circuit 64 monitors and detects the voltage on the lines Vbus 41 and GND 42. The voltage detecting circuit 64 is connected with the bus manager circuit 62 via a signal line 43. The voltage detecting circuit 64 detects the voltage on the lines Vbus 41 and GND 42 and the detection is transferred to the bus manager circuit 62 as a host connection indication signal 43 to indicate whether the host personal computer 1 is connected to the portable phone 5.

The bus manager circuit 62 is connected to the signal lines D+ 11' and D− 12'. The bus manager circuit 62 determines whether the host is connected on the upstream side, based on the host connection indication signal 43. Also, the bus manager circuit 62 determines whether the host personal computer 1 is in a bus manager state or in a suspended state, based on the host state signal 13. When the host personal computer 1 is not connected, or when the host personal computer 1 is in the suspended state, the bus manager circuit 62 carries out a bus manager function. On the other hand, when the host personal computer 1 operates as a bus manager, the bus manager circuit 62 stops or invalidates the bus manger function and passes through the signal between the host personal computer 1 and the bus peripheral units. A slave function circuit 66 to be described later is one of the bus peripheral units. Also, when the host personal computer 1 is not connected, or when the host personal computer 1 is in the suspended state, the bus manager circuit 62 sends a power selection signal 55 to a power supply switching circuit 65.

The lines Vbus 41 and GND 42 are connected with the power supply switching circuit 65. Lines Vcc 51 and GND 52 from an internal power source (not shown) of the portable phone 5 are connected with the power supply switching circuit 65 to supply a power supply voltage. The power supply switching circuit 65 selects one of the power supply voltage on the lines Vcc 51 and GND 52 and the power supply voltage on the lines Vbus 41 and GND 42 in response to the power selection signal 55 from the bus manager circuit 62. When the host personal computer 1 operates as the bus manager, the power supply switching circuit 65 supplies the power supply voltage from the host personal computer 1. On the other hand, when the host personal computer 1 is not connected, or when the host personal computer 1 is in the suspended state, the power supply switching circuit 65 supplies the power supply voltage from the portable phone 5 in response to the power selection signal 55. The power supply switching circuit 65 supplies the selected power supply voltage to an external device connected to the portable phone on a downstream side via lines Vbus 53 and GND 54.

The bus manager circuit 62 is connected with a hub unit 63 via signal line 21 and a set of signal lines 22 and 23. The hub unit 63 is connected to a slave function circuit 66 via a set of signal lines 33 and 34. Also, the hub unit 63 is connectable to the external device via a set of a signal line D+ 31 and a signal line D− 32. The hub circuit 63 branches signal transfer routes in response to a branch control signal 21 from the bus manager circuit 62. For example, signal lines 22 and 23 from the bus manager circuit 62 are connected to the signal lines 33 and 34 or to the signal line 31 and 32. Also, the signal lines 31 and 32 are connected to the signal lines 33 and 34.

Next, the operation of the portable phone will be described.

First, it is supposed that the host personal computer 1 is not connected to the portable phone 5, that is, the mobile terminal system is composed of the portable phone 5 functioning as the bus manager and the third device 6 functioning as a bus slave peripheral unit of portable phone 5, as shown in FIG. 2. In this case, any power supply voltage is not supplied from the host personal computer 1 to the voltage detecting circuit 64. As a result, the voltage detecting circuit 64 does not generate the host connection indication signal 43. Therefore, the bus manager circuit 62 carries out the bus manager function to operate as the bus manger. The bus manager circuit 62 generates the branch control signal 21 to control the hub unit 63. Also, the bus manager circuit 62 outputs the power selection signal 55 to the power supply switching circuit 65. Thus, the power supply voltage inside the portable phone 5 is supplied to the third device 6 via the power supply lines 53 and 54. In this case, data are communicated between the slave function circuit 66 and the third external device 6 via the hub unit 63. Here, the slave function circuit 66 may be a communication section or a data communication section in the portable phone 5.

Next, it is supposed that the host personal computer 1 is connected to the portable phone 5 but the host is in the suspended state. Also, it is supposed that the third device 6 is connected to the portable phone 5, as shown in FIG. 1. In this case, because the host personal computer 1 is connected to the portable phone 5 on the upstream side of the portable phone 5, the power supply voltage is supplied from the host personal computer 1 to the voltage detecting circuit 64. As a result, the voltage detecting circuit 64 generates the host connection indication signal 43 to output to the bus manager circuit 62. However, because the host personal computer 1 is in the suspended state, no signal is supplied from the host to the level detecting circuit 61 and the bus manger circuit 62. Thus, the level detecting circuit 61 does not generate the host state signal 13. Therefore, the bus manager circuit 62 determines that bus manger circuit 62 should be the bus manger. Therefore, the bus manager circuit 62 carries out the bus manager function to operate as the bus manger. Also, the bus manager circuit 62 outputs the power selection signal 55 to the power supply switching circuit 65. Thus, the power supply voltage inside the portable phone 5 is supplied to the third device 6 via the power supply lines 53 and 54. Also, the bus manager circuit 62 outputs the branch control signal 21 to the hub unit 63 to control data transfer. In this case, data are communicated between the slave function circuit 66 and the third external device 6 via the hub unit 63.

Next, it is supposed that the host personal computer 1 is connected to the portable phone 5 and the host personal computer 1 is in the bus manager state. Also, it is supposed that the third device 6 is connected to the portable phone as shown in FIG. 1. In this case, because the host personal computer 1 is connected to the portable phone 5 on the upstream side of the portable phone 5, the power supply voltage is supplied from the host personal computer 1 to the voltage detecting circuit 64. As a result, the voltage detecting circuit 64 generates the host connection indication signal 43 to output to the bus manager circuit 62. Also, because the host personal computer 1 is in the bus manager state, the level detecting circuit 61 detects the signal on the signal lines 11 and 12 to generate the host state signal 13. The host state signal is supplied to the bus manger circuit 62. Thus, the bus manager circuit 62 determines that bus manger circuit 62 should be a bus slave. As a result, the bus manager circuit 62 does not carry out the bus manager function to operate as the bus slave. Also, the bus manager circuit 62 outputs the power selection signal 55 to the power supply switching circuit 65. Thus, the power supply voltage from the host personal computer 1 is supplied to the third device 6 via the power supply lines 53 and 54. Also, the bus manager circuit 62 outputs the branch control signal 21 to the hub unit 63 to control data transfer. In this case, the bus manager circuit 62 only passes the signals. Thus, data are communicated between the slave function circuit 66, the host personal computer 1, the third external device 6 via the hub unit 63.

There is a case where the mobile terminal as a portable phone is connected to the host personal computer. In this case, the mobile terminal should function as a slave. On the other hand, when the mobile terminal is operated without being connected with the host computer, the mobile terminal should function as the bus manager. Therefore, a switching function between the bus manager and the bus slave is required conventionally. As described above, according to the present invention, two bus functions of a bus manager and a slave exist in the mobile terminal. Therefore, the mobile terminal can be used in various conditions.

Also, when the mobile terminal is connected to the host computer, the mobile terminal can be dynamically switched between the bus manager and bus slave based on the signal from the host computer.

What is claimed is:

1. A portable terminal, comprising:
   a host detector detecting whether a host operates as a bus manager;
   a hub circuit having a hub function and connectable to an external device; and
   a bus manager circuit having a bus manager function, wherein said bus manager circuit stops said bus manager function such that said host can operate as said bus manager for said portable terminal and said external device connected to said portable terminal, when said host operates as said bus manager, and carries out said bus manager function such that said bus. manager circuit can operate as said bus manager for said portable terminal and said external device connected to said portable terminal, when said host does not operate as said bus manager.

2. A portable terminal according to claim 1, wherein said host detector outputting a bus manager indication signal in response to reception of a signal from said host, and
   wherein said bus manager circuit determines that said host operates as said bus manager, in response to said bus manager indication signal.

3. A portable terminal according to claim 1, further comprising:
   a host connection detector detecting whether said host is connected, and
   wherein said bus manager circuit carries out said bus manager function, when said host is not connected.

4. A portable terminal according to claim 3, wherein said host connection detector detects whether a power source voltage is supplied, and determines that said host is connected when said power supply voltage is supplied.

5. A portable terminal according to claim 4, further comprising:
   an internal power source supplying a power source voltage; and
   a switching circuit outputting one of said power source voltage from said host and said power source voltage from said internal power source to said external device in response to a power control signal, when said external device, and
   wherein said bus manager circuit generates said power control signal when said host is connected.

6. A bus manager control method, comprising:

(a) determining whether a host is connected to a portable terminal, said host having a bus manager function, and said portable terminal having a bus manager function and a hub function and being connectable with an external device;

(b) determining whether said host is in a suspended state, when it is determined that said host is connected to said portable terminal;

(c) stopping said bus manager function of said portable terminal such that said host can operate a bus manager for said portable terminal and said external device connected to said portable terminal, when said host is connected to said portable terminal and is not in the suspended state; and (d) carrying out said bus manager function of said portable terminal such that said portable terminal can operate as said bus manager for said portable terminal and said external device connected to said portable terminal, when said host is not connected to said portable terminal or when said host is in the suspended state.

7. A bus manager control method according to claim 6, wherein said (a) determining includes:

detecting a power source voltage from said host; and determining that said host is connected to said portable terminal, when said power source voltage is detected.

8. A bus manager control method according to claim 7, further comprising:

connecting said power source voltage to said external device, when said power source voltage is detected.

9. A bus manager control method according to claim 7, wherein said (b) determining includes:

detecting a signal transferred from said host; and determining that said host operates as said bus manager, when said signal is transferred from said host.

* * * * *